United States Patent [19]

Schuhmann et al.

[11] Patent Number: 5,277,970

[45] Date of Patent: Jan. 11, 1994

[54] SEALABLE WHITE FILM MADE OF POLYOLEFINS

[75] Inventors: Detlef E. Schuhmann, Kiedrich; Herbert Peiffer, Mainz-Finthen; Ursula Murschall, Nierstein; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 894,542

[22] Filed: Jun. 5, 1992

[30] Foreign Application Priority Data

Jun. 6, 1991 [DE] Fed. Rep. of Germany ....... 4118572

[51] Int. Cl.$^5$ ............................................. B32D 5/02
[52] U.S. Cl. ............................... 428/323; 428/35.7; 428/349; 428/317.9; 428/910
[58] Field of Search .............. 428/516, 317.9, 349, 428/910, 323, 35.7

[56] References Cited

U.S. PATENT DOCUMENTS

| | | | |
|---|---|---|---|
| 3,900,670 | 8/1975 | Ikeda et al. | 428/308 |
| 4,058,649 | 11/1977 | Steiner | 428/518 |
| 4,303,708 | 12/1981 | Gebhardt et al. | 428/35 |
| 4,375,989 | 3/1983 | Mäkinen | 106/300 |
| 4,447,271 | 5/1984 | Howard et al. | 106/300 |
| 4,666,772 | 8/1987 | Schinkel et al. | 428/516 |
| 4,749,616 | 6/1988 | Liu et al. | 428/331 |
| 4,758,462 | 7/1988 | Park et al. | 428/516 |
| 4,780,364 | 10/1988 | Wade et al. | 428/315.5 |
| 4,842,187 | 6/1989 | Janocha et al. | 229/87 F |
| 4,956,232 | 9/1990 | Balloni et al. | 428/349 |
| 4,961,992 | 10/1990 | Balloni et al. | 428/349 |
| 5,128,205 | 7/1992 | Butler | 428/516 |

FOREIGN PATENT DOCUMENTS 0214790 3/1987 European Pat. Off. .
0515969 2/1992 Fed. Rep. of Germany .

*Primary Examiner*—Edith Buffalow
*Attorney, Agent, or Firm*—Foley & Lardner

[57] ABSTRACT

A multilayered, white, biaxially-oriented polypropylene film is disclosed. The film has an at least three-layered build-up and has a base layer comprised of propylene polymers comprising up to 2% by weight of calcium carbonate having an average particle size of not more than 2.0 μm and 0 to 25% be weight of titanium dioxide, an intermediate layer comprised of propylene polymers comprising 0 to 25% by weight of titanium dioxide, relative to the total weight of the intermediate layer; and a top layer comprised of a sealable raw material. The base layer and/or the intermediate layer of the film contain a total of at least 2% by weight of titanium dioxide.

22 Claims, 2 Drawing Sheets

FIG. I

SEALABLE WHITE FILM MADE OF POLYOLEFINS

BACKGROUND OF THE INVENTION

The present invention relates to a biaxially-oriented opaque polypropylene film.

Biaxially-oriented, transparent or opaque polypropylene films are widely used in the packaging industry. Goods wrapped in opaque films, in particular chocolate bars or cookies, are protected against the influence of light to a far higher degree than goods wrapped in transparent films, which is of advantage in view of the desired long-term storability of the respective goods. Opaque films are films possessing vacuoles and are well-known in the art.

Disadvantages arise when opaque films are to be processed into bags or similar containers on high-speed automatic packaging machines. Usually, machines of this type are designed so that the film is guided, by exerting a tensile force, over an appropriately shaped forming tool to produce a tubing with overlapping edges from the flat film. Further process steps including sealing, filling of the tubing with the goods to be packaged and severing of the filled tubing sections, result in the individual bags.

When opaque, vacuole-containing films are guided over a forming tool in order to shape them into tubings, it is frequently observed that stripe-like markings of varying intensity appear in the longitudinal direction of the film or tubing. This adversely affects the optical appearance of the package. Text printed in the area of these undesired markings can only be read with difficulty, and industrial users that employ such films for packaging their quality products do not accept them, because an impression of inferior quality might be given to the end consumer. The markings are obviously a result of the compressibility of vacuole-containing opaque films, which is strongly increased as compared to transparent films. In the case of transparent films markings of the described type are not visible.

SUMMARY OF THE INVENTION

It is therefore an object of the instant invention to provide a white film that on the one hand offers good light-protection to the goods to be packaged therein, and on the other hand can be processed into packaging bags on high-speed automatic packaging machines without the formation of visible stripes on the film surface.

It is a further object of the present invention to provide a white film that provides light protection that is greater than that which can be achieved by printing the film, for example, with a white dye.

It is another object of the invention to provide a film that has an attractive visual appearance.

It is yet another object of the invention to provide a film having a surface gloss on the outer, printable surface that is substantially as high as that of a comparable transparent film.

It is a further object of the invention to provide a film having mechanical properties that are comparable to those of a transparent film.

It is another object of the invention to provide a film having a density that does not exceed about 0.92 g/cm³ and is not markedly less than about 0.9 g/cm³.

These and other objects of the invention are achieved by a multilayered white, biaxially-oriented polypropylene film, comprising a base layer of propylene polymers containing up to 2% by weight of calcium carbonate of an average particle size of not more than 2.0 μm and up to 25% by weight of titanium dioxide, in each case relative to the total weight of the base layer; an intermediate layer of propylene polymers, containing up to 25% by weight of titanium dioxide relative to the weight of the intermediate layer; and a top layer of a sealable raw material, wherein the overall content of titanium dioxide of the film is at least about 2% by weight, relative to the total weight of the film. A packaging material comprising this film is also provided.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
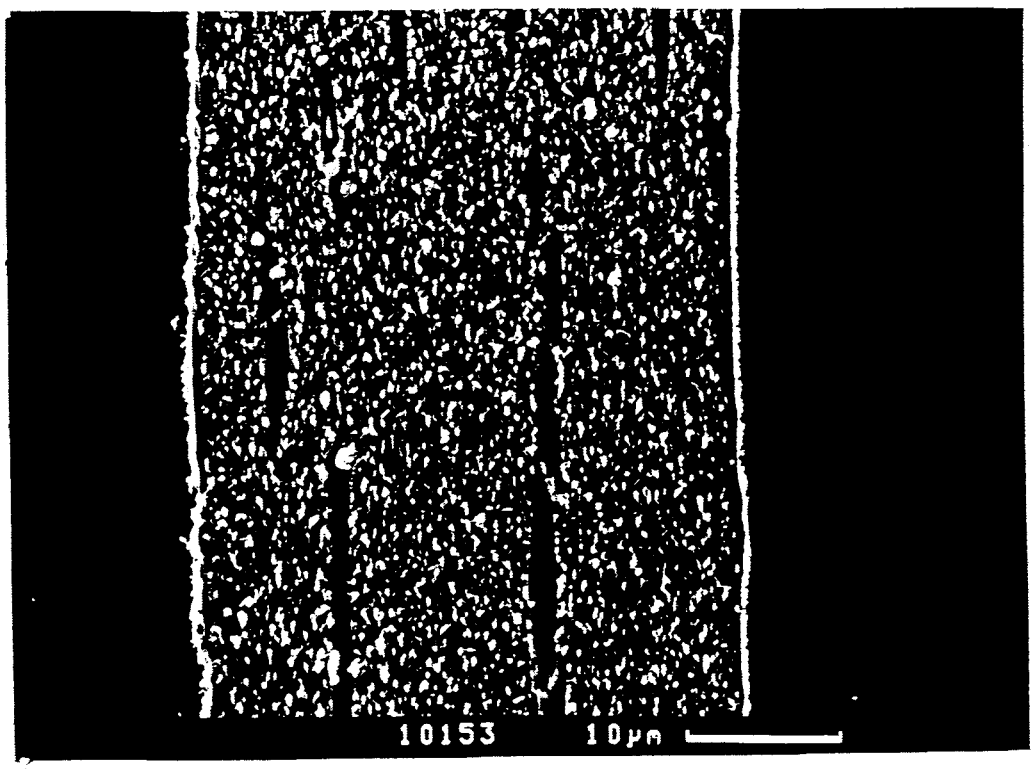
FIG. 1 is a scanning electron micrograph showing a vertical cross-section through a film according to the invention.

The film according to the present invention has an at least three-layered build-up, comprising a base layer of propylene polymers that contains not more than about 2% by weight of calcium carbonate of an average particle size of not more than about 2.0 μm and about 0 to 25% by weight of titanium dioxide, in each case relative to the total weight of the base layer, an intermediate layer of propylene polymers, containing about 0 to 25% by weight of titanium dioxide, relative to the total weight of the intermediate layer, and a top layer of a sealable raw material. The overall content of titanium dioxide of the film is at least about 2% by weight, relative to the total weight of the film.

Within the scope of the instant invention the term propylene polymers of the base layer and/or of the intermediate layer of the film, respectively, designates an isotactic homopolymer or copolymer of propylene with ethylene or alpha-olefins having 4 to 8 carbon atoms or a mixture of propylene homopolymers and propylene copolymers and/or other polyolefins having, in particular, 2 to 6 carbon atoms, wherein the mixture comprises at least about 50% by weight, preferably at least about 75% by weight, of propylene homopolymer. The isotactic homopolymer expediently has a fraction that is soluble in boiling n-heptane of not more than about 15% by weight, preferably of not more than about 10% by weight. The proportion of ethylene and $C_4$- to $C_8$-alpha olefin comonomers contained in the copolymers generally does not exceed 10% by weight of the copolymer.

Ethylene and butene-(1) are preferred comonomers. Suitable polyolefins for the polymer mixture include high-density polyethylene (HDPE), low-density polyethylene (LDPE) and linear low-density polyethylene (LLDPE), in which the proportion of each of these polyolefins does not exceed about 15%, relative to the weight of the polymer mixture. The propylene polymers advantageously have a melt flow index in the range of about 0.5 g/10 min to 8 g/10 min, particularly about 1.5 g/10 min to 4 g/10 min, each time determined at a temperature of 230° C. and under a load of 21.6 N (DIN 53,735). The polymer or polymer mixtures for the base layer and for the intermediate layer(s) are selected independently of one another. That is, the base layer and the intermediate layer may have the same composition or different compositions. The same also applies to cases where two intermediate layers are present.

The calcium carbonate particles may be natural stone powders, such as calcareous spar, limestone, calcite or chalk, if these are not severely polluted by other substances. It is also possible to employ carbonate particles produced by precipitation.

Precipitated calcium carbonate can be produced by various methods. Usually, the process comprises decomposing natural stone powder based on calcium carbonate, especially natural limestone, at temperatures above about 900° C., into calcium oxide and carbon dioxide. The burnt lime is slaked with water and subsequently carbonated with purified carbon dioxide. In this way, an aqueous suspension of the calcium carbonate particles is obtained.

Compared with the calcium carbonate contained in known opaque polypropylene films, the calcium carbonate contained in the base layer of the film according to the present invention preferably has a small average particle size and is present in an amount of not more than 1.5% by weight, relative to the weight of the base layer. Preferably, the added amount of calcium carbonate is in the range from about 0.3 to 1.0% by weight. Films provided with calcium carbonate pigments according to the invention differ considerably from the conventional, known opaque films. This difference is shown in FIGS. 1 and 2.

Figure 2:
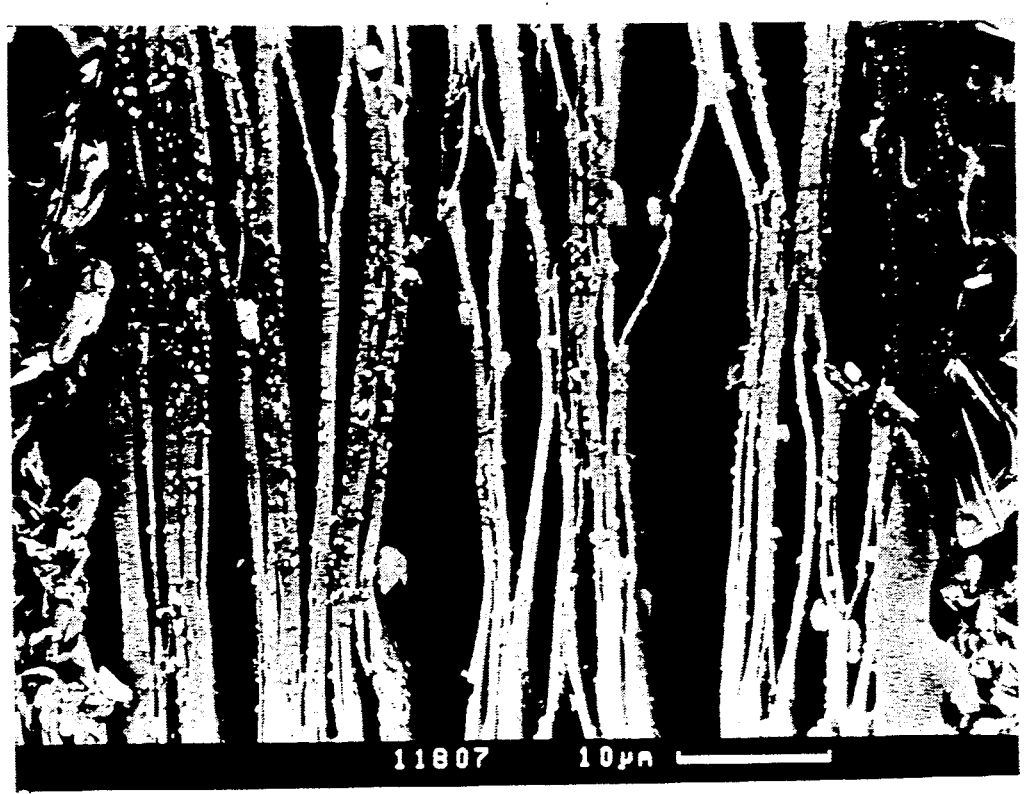
FIG. 2 is a scanning electron micrograph showing a vertical cross-section through a comparison film.

FIG. 1 is a SEM photograph showing a vertical cross-sectional cut through a film. The film only contains 0.8% by weight of calcium carbonate having an average particle size of 1.5 $\mu$m. FIG. 2 is a SEM photograph showing a vertical cross-sectional cut through another film. The magnification factor is the same as in FIG. 1. The film shown in FIG. 2 contains 4.0% by weight of calcium carbonate having an average particle size of 3 $\mu$m. The high content of calcium results in the lamellar structure of the opaque film, which is responsible for the low density of the film of less than 0.8 g/cm$^3$. When the content of calcium is reduced, the film does not have the overall lamellar appearance shown in FIG. 2, but only presents a number of individual, discrete, relatively small vacuoles, as shown in FIG. 1.

The size of the calcium carbonate particles is of decisive importance. Standard opaque films usually have an average particle size of about 3 $\mu$m, with an upper limit average value of about 12 $\mu$m. This results in a relatively high surface roughness value of the vacuole-containing layer, which considerably impairs the surface gloss of the film. With decreasing particle sizes the smoothness of the film surface will increase. However, the particle size can be reduced to a limited degree only, for below a certain size the dispersibility of the calcium carbonate is impaired and agglomerates form. Furthermore, the vacuole formation is suppressed when the particle size is below a certain level. Within the scope of the instant invention, an average particle size of 2 $\mu$m has been found to be advantageous. Preferably the average particle size should be between about 0.1 $\mu$m and 1.5 $\mu$m.

The titanium particles may be anatase or rutile. Preferably the predominant proportion is rutile, which has a higher opacity than anatase. In a preferred embodiment at least about 95% by weight of the titanium dioxide particles are rutile particles. They are produced by means of any of the processes customarily employed, such as the chloride or sulfate method. They are present in the base layer in an amount of about 0 to 25% by weight, preferably of about 2 of 12% by weight, more preferably 5 to 9% by weight, relative to the weight of the base layer. The intermediate layer(s) may also contain titanium dioxide, in amounts of about 0 to 25% by weight, preferably about 0 to 10% by weight, more preferably 0 to 6% by weight, each time relative to the weight of the respective intermediate layer. The total amount of titanium dioxide contained in the film should be at least about 2% by weight, preferably in the range of about 4 to 25% by weight, relative to the weight of the total film. The average particle size is relatively small; preferably it is in the range of about 0.10 to 0.30 $\mu$m. Titanium dioxide particles of the above described type do not cause vacuole formation within the polymer matrix during film manufacture.

The titanium dioxide particles may be provided with a coating of inorganic oxides, of the type usually employed for TiO$_2$ white pigment in papers or paints to improve the light fastness. As is known, TiO$_2$ is photoactive. Upon exposure to UV radiation, free radicals form on the particle surface, which may migrate to the film-forming components of the paints, causing degradation reactions and yellowing. Particularly suited coating oxides include the oxides of aluminum, silicon, zinc or magnesium or mixtures containing two or more of these compounds. EP 44,515 and 78,633, for example, describe TiO$_2$ particles provided with coatings containing several of the above compounds. In addition, the coating may contain organic compounds having polar and non-polar groups. The organic compounds must be sufficiently heat-resistant to withstand the temperatures arising during film manufacture by extrusion of the polymer melt. Examples of suitable polar groups include —OH, —OR, or COOX groups (R=C$_1$ to C$_{34}$ alkyl; X=R, H or Na). Preferred organic compounds are alkanols and fatty acids having 8 to 30 carbon atoms in their alkyl groups, in particular fatty acids and primary n-alkanols having 12 to 24 carbon atoms, and polydiorganosiloxanes and/or polyorganohydrogen siloxanes, such as polydimethyl siloxane and polymethylhydrogen siloxane.

The coating present on the titanium dioxide particles generally contains about 1 to 12 g, in particular about 2 to 6 g, of inorganic oxides and about 0.5 to 3 g, in particular about 0.7 to 1.5 g, of organic compounds, in each case related to 100 g of a titanium dioxide particles. The coating is applied to the particles in the form of an aqueous suspension. The inorganic oxides are precipitated in the aqueous suspension from water-soluble compounds, such as alkali metal aluminate, particularly sodium aluminate, aluminum hydroxide, aluminum sulfate, aluminum nitrate, sodium silicate (sodium water glass) or silicic acid.

The term inorganic oxides, such as Al$_2$O$_3$ and SiO$_2$, also covers the hydroxides and the various stages of dehydration thereof, such as oxide hydrates, without their exact composition and structure being known in all cases. Following calcination and milling of the TiO$_2$ pigment, the oxide hydrates, for example, of aluminum or silicon, are deposited in aqueous suspension. Then the pigments are washed and dried. Thus, the deposition can be performed directly in a suspension of the type present in the production process after calcination and subsequent wet milling. The deposition of the oxides and/or oxide hydrates of the individual metals is performed from the water-soluble metal salts in the known pH range. In the case of aluminum, an aqueous solution (pH less than 4) of aluminum sulfate is, for example, used, and the oxide hydrate is deposited in a pH range of 5 to 9, preferably of 7 to 8.5, which is set by the addition of aqueous ammonia solution or soda lye. If a water glass or alkali metal aluminate solution is used, the pH of the initially introduced $TiO_2$ suspension should be in the highly alkaline region (pH higher than 8). The deposition is then performed at a pH value of between 5 and 8, which is set by the addition of a mineral acid, such as sulfuric acid. Following the deposition of the metal oxides stirring of the suspension is continued for about 15 to 120 minutes, to age the deposited layers. The coated product is separated from the aqueous dispersion, and is then washed and dried at an elevated temperature, in particular between about 70° and 110° C.

In accordance with the present invention, titanium dioxide particles of the above type may be present either in the base layer or in the intermediate layer or in both layers. The degree of whiteness, and thus the protection against light, of the total film is a direct function of the total amount of titanium dioxide, and in accordance with this invention it should be at least about 80, preferably about 85 to 100.

The top layer applied onto the intermediate layer may be a heat-sealable layer or a cold-sealable layer. Top layers comprising a sealable raw material may also be present on both surfaces of the film. Such double-sided top layers comprise the same material or different materials. Each heat-sealable layer has a softening point which is at least about 10° C. below the softening point of the base layer and of the intermediate layer. The sealing layer is preferably made of an ethylene homopolymer (high-density polyethylene or low-density polyethylene); a LLDPE; a copolymer comprising propylene as the main component and ethylene, the ethylene content preferably being about 4 to 10% by weight, relative to the weight of the copolymer; a copolymer comprising propylene as the main component and butene-(1), the butene-(1) content preferably being about 10 to 15% by weight, relative to the weight of the copolymer; a terpolymer comprising propylene, ethylene and an alpha-olefin having 4 to 10 carbon atoms, the propylene content preferably being about 93.2 to 99.0% by weight, the ethylene content preferably being about 0.5 to 1.9% by weight, and the $C_4$ to $C_{10}$-alpha-olefin content preferably being about 0.5 to 4.9% by weight, each time relative to the weight of the terpolymer; or a mixture of two or more of the polymers enumerated above. The comonomers are present in the polymers in essentially random distribution. Particular preference is given to sealable layers comprised of random, alpha-olefin-containing copolymers where the ratio between the weight average molecular weight distribution $M_W$ and the number average molecular weight distribution $M_N$ is between about 2.5 and 5.5. Preferably, the copolymers are peroxidically degraded.

When the film according to the invention is used as a packaging film, the top layer(s) preferably also contain(s) a lubricant in order to ensure satisfactory machine running properties and an easy insertion of the packaged goods into bags. Suitable lubricants include polydialkyl siloxanes, which preferably have 1 to 4 carbon atoms in their alkyl groups, with polydimethyl siloxane being particularly preferred. The polydialkyl siloxane is present in the top layer(s) in an amount of about 0.2 to 2.5% by weight, preferably of about 0.5 to 1.6% by weight, relative to the weight of the top layer(s).

By the addition of about 0.1 to 1% by weight, particularly of about 0.2 to 0.5% by weight, of an organic or inorganic anti-blocking agent to the top layer(s), the processing of the film is particularly improved. Examples of suitable anti-blocking agents include organic polymers, such as polyamide, polyesters, polycarbonates, and the like, that are incompatible with the polymer of the top layer and are present in particulate form, or inorganic particles, in particular silicon dioxide.

For producing the film of the instant invention, any conventional process for producing multilayered films can be employed. For example, the film can be produced by coextrusion of the melts of the polymer materials selected for the individual layers through a flat sheet die. This step is followed by chilling and solidification of the cast film, subsequent biaxial orientation in the longitudinal and transverse directions and final heat-setting. Biaxial orientation is achieved by first heating the film and then subjecting it to stretching in the longitudinal direction followed by stretching in the transverse direction or to stretching in the transverse direction followed by stretching in the longitudinal direction. Stretching in the longitudinal direction is performed, for example, at a temperature of about 120° C. to 130° C. at a stretch ratio of about 5:1 to 7:1, and the subsequent stretching in the transverse direction is, for example, performed at a temperature of about 160° C. to 170° C. at a stretch ratio of about 8:1 to 10:1, and heat-setting is performed at a temperature of about 150° to 160° C. for a duration of about 0.5 to 10 seconds. If necessary, the top layer(s) can be subjected to an additional surface treatment following the heat-setting step, in order to improve the affinity of the film towards further coatings and to improve its bonding and laminating properties and its printability and/or metallizability.

Suitable cold sealable layers contain polymers based on natural or synthetic rubber. Suitable outer or top layers may also consist of acrylates, such as those described in EP 214,790, EP 254,417 and CH Patent 632,777 or of vinylidene chloride copolymers, such as those mentioned in EP 088,535. If necessary, these compounds can be anchored to the underlying polyolefin layer by means of an adhesion-promoting layer. Primers or adhesion promoters suitable for this purpose are also disclosed in the above publications. Whereas cold-sealable layers can only be applied in an off-line process, i.e., in a separate process step, the acrylates or vinylidene copolymers can also be applied by an in-line process step prior to stretching in the longitudinal direction. A suitable in-line process is, for example, described in EP 214,790.

The film according to this invention may either be designed as a three-layered film or as a four-layered film, where the fourth layer is a second top layer. The film may also comprise a further intermediate layer that is applied between the base layer and the second top layer.

The film has a total thickness of about 25 to 120 μm, preferably of about 30 to 60 μm. The thickness of the top layer(s) is about 0.1 to 5 μm, preferably about 0.6 to 2 μm in each case, and the thickness of the intermediate layer(s) is about 0.3 to 5 μm, preferably about 0.5 to 3 μm in each case.

In order to further improve specific properties of the film according to the invention, the base layer and/or the intermediate and top layer(s) can contain effective amounts of appropriate additives. Above all, these include antistatic agents, such as N,N-bis-ethoxyalkyl amine, and nucleating agents, such as sorbitols. The addition of processing stabilizers to the base layer has been found to be particularly advantageous. These compounds are added to prevent thermal degradation of the polymers during film production. Examples of suitable stabilizers include phosphite stabilizers and/or diphosphite stabilizers, such as tris-(2,4-di-tert.-butyl-phenyl)phosphite and bis-(2,4-di-tert.-butylphenyl)pentaerythritol disphosphite, which are added in amounts of about 0.05 to 0.3% by weight, relative to the weight of the base layer. In addition, the incorporation of optical brighteners has been found to be particularly advantageous; these include, for example, bis-benzoxazoles, bis-(styryl)-biphenyls, triazine-phenyl coumarines or benzotriazole phenyl coumarines and are added in amounts of about 100 to 500 ppm, in particular of about 150 to 250 ppm, relative to the weight of the base layer. The addition of natural or synthetic low-molecular weight resins, in particular hydrocarbon resins, to the intermediate layer(s) has also been found to be advantageous. Suitable low-molecular weight resins have a softening point in the range of about 60° to 180° C., preferably of about 80° to 130° C.

The film according to the present invention is distinguished by a high degree of whiteness (higher than 80), high mechanical strength, a density of not more than 0.92 g/cm$^3$ and high gloss on at least one surface (gloss value higher than 50, at a measuring angle of 20°). Moreover, it can be readily sealed and printed without difficulty. It is normally substantially free of stripe-like markings, that adversely affect its appearance and/or the readability of text printed thereon.

The film is illustrated in even greater detail by means of the Examples which follow.

EXAMPLE 1

Five-layered film having the following, symmetrical build-up:
A: Base layer comprised of
  93.05% by weight of a propylene homopolymer having a melt flow index of 4.5 g/10 min 230° C., 21.6 N),
  6.00% weight of titanium dioxide (rutile) having an average particle size of 0.2 μm and provided with an inorganic coating comprising Al$_2$O$_3$ and an organic coating comprising stearic acid,
  0.80% by weight of calcium carbonate having an average particle size of 1.5 μm, and
  0.15% by weight of N,N-bis-ethoxyalkylamine.
B,C: Intermediate layers comprised of
  97.00% by weight of polypropylene homopolymer having a melt flow index of 5 g/10 min (230° C., 21.6 N), and
  3.00% by weight of the titanium dioxide used in layer A.
D,E: Top layers comprised of
  99.80% by weight (corona-treated top layer) or 98.80% by weight (not corona-treated top layer) of an ethylene/propylene copolymer having a melt flow index of 5 g/10 min (230° C., 21.6 N),
  0.20% by weight of silicon dioxide having an average particle size of 3 μm, and
  1.00% by weight of polydimethyl siloxane (only added to top layer that is not corona-treated).
Total film thickness: 30.00 μm
Thickness of layer A: 20.80 μm
Thickness of layers B, C: 4.00 μm
Thickness of layers D, E: 0.60 μm The cast film is produced by coextrusion and is subjected to stretching in the longitudinal and transverse directions, employing conventional methods. The physical properties of the film are summarized in the Table at the end of the Examples. The values indicated in the Table were determined as follows:

The whiteness, determined according to Berger, is measured by means of an electrical reflectance photometer of the type "ELREPHO", made by Zeiss, Oberkochem, Germany, using standard illuminant C, 2° standard observer. The whiteness is defined as:

$$W = R_Y + 3R_Z - 3R_X$$

W = whiteness
$R_Y$, $R_Z$, $R_X$ = corresponding reflection factors using the Y, Z, and X color measuring filter.

A pellet of barium sulfate is used as the white standard (DIN 5033, part 9).

The gloss is determined in accordance with DIN 67,530. The reflector value is measured as an optical parameter of the surface of the film. Analogously to standards ASTM-D 523-78 and ISO 2813, the angle of light incidence is set at 20°. A light beam impinges on the flat surface to be tested under the preset incident angle and is reflected or scattered by the surface. The light beams falling onto the photoelectronic receiver are displayed as a proportional electrical parameter. The measured value is dimensionless and must always be stated together with the angle of light incidence.

The modulus of elasticity (E-modulus) and the tear resistance of the film are determined in accordance with DIN 53,457.

EXAMPLE 2

Four-layered, non-symmetrical film having the following build-up:
A: Base layer: as in Example 1.
B: Intermediate layer: as in Example 1.
C,D: Top layers: as in Example 1.
This film has only one high-gloss surface.

EXAMPLE 3

Five-layered film having the following symmetrical build-up:
A: Base layer: as in Example 1, but containing 7% by weight of titanium dioxide.
B,C: Intermediate layers: as in Example 1, but without titanium dioxide.
C,D: Top layers: as in Example 1.

EXAMPLE 4

Five-layered film having the following symmetrical build-up:
A: Base layer: as in Example 3.

B,C: Intermediate layers: as in Example 3, but additionally containing 5% by weight of hydrocarbon resin.

D,E: Top layers: as in Example 3.

COMPARATIVE EXAMPLE 1

The film is identical to that of Example 1, with the exception that no calcium carbonate is contained in the base layer. The density of the film is considerably higher than that of films produced according to the present invention. As a result the surface yield of the film is reduced, i.e., the surface area per kg of the film roll is too low.

|  | Whiteness (Berger) | Density kg/dm$^3$ | Gloss upside/ underside | Tear resistance N/mm$^2$ longit./ transv. | Modulus of elasticity N/mm$^2$ longit./ transv. |
|---|---|---|---|---|---|
| Example 1 | 90 | 0.91 | 62/62 | 135/300 | 2200/4500 |
| Example 2 | 90 | 0.905 | 62/10 | 130/280 | 2100/4400 |
| Example 3 | 92 | 0.91 | 65/65 | 135/300 | 2200/4500 |
| Example 4 | 92 | 0.91 | 68/68 | 140/310 | 2350/4670 |
| Comp. Example 1 | 91 | 0.98 | 62/62 | 135/300 | 2200/4500 |

What is claimed is:

1. Multilayered white, biaxially-oriented polypropylene film, comprising:
   a base layer of propylene polymers containing up to 2% by weight of calcium carbonate of an average particle size of not more than 2.0 μm and up to 25% by weight of titanium dioxide, in each case relative to the total weight of the base layer;
   an intermediate layer of propylene polymers, containing up to 25% by weight of titanium dioxide relative to the weight of the intermediate layer; and
   a sealable top layer,
   wherein the overall content of titanium dioxide of the film is at least about 2% by weight, relative to the total weight of the film.

2. The film as claimed in claim 1, wherein the propylene polymer of the base layer and of the intermediate layer of the film, respectively, is selected from the group consisting of isotactic homopolymers and copolymers of propylene with ethylene or alpha-olefins having 4 to 8 carbon atoms and a mixture of polymers selected from the group consisting of propylene homopolymers, propylene copolymers and other polyolefins, the mixture comprising at least about 50% by weight of propylene homopolymer.

3. The film as claimed in claim 1, wherein the calcium carbonate is contained in an amount of not more than about 1.5% by weight, relative to the weight of the base layer.

4. The film as claimed in claim 1, wherein the mean particle size of the calcium carbonate particles is about 2 μm.

5. The film as claimed in claim 1, wherein the titanium dioxide contained in the base layer has an average particle size in the range of about 0.10 μm to 0.30 μm.

6. The film as claimed in claim 1, having a whiteness number of at least about 80.

7. The film as claimed in claim 1, wherein the sealable top layer comprises a sealable raw material selected from the group consisting of an ethylene homopolymer; and copolymer comprising propylene as the main component and ethylene, the ethylene content being about 4 to 10% by weight, relative to the total weight of the copolymer; a copolymer comprising propylene as the main component and butene-(1), the butene content preferably being about 10 to 15% by weight, relative to the total weight of the copolymer; a terpolymer comprising propylene, ethylene and an alpha-olefin having 4 to 10 carbon atoms, the terpolymer comprising about 93.2 to 99.0% by weight of propylene, 0.5 to 1.9% by weight of ethylene and 0.5 to 4.9% by weight of an alpha-olefin having 4 to 10 carbon atoms; and a mixture comprising two or more of these polymers.

8. The film as claimed in claim 1, comprising a second top layer.

9. The film as claimed in claim 8, comprising a further intermediate layer between the second top layer and the base layer.

10. The film as claimed in claim 1, wherein lubricant for improving the slip properties of the film is additionally contained in the top layer, the lubricant being a polydialkyl siloxane having 1 to 4 carbon atoms in the alkyl group, and wherein the top layer contains about 0.1 to 1% by weight, of an organic or inorganic antiblocking agent.

11. The film as claimed in claim 1, wherein the calcium carbonate is contained in an amount of about 0.3 to 1.0% by weight, relative to the weight of the base layer.

12. The film as claimed in claim 1, wherein the mean particle size of the calcium carbonate particles is between about 0.9 and 1.5 μm.

13. The film as claimed in claim 10, wherein the top layer contains about 0.2 to 0.5% by weight of the organic or inorganic antiblocking agent.

14. The film as claimed in claim 1, wherein the overall content of titanium dioxide of the film is about 4 to 25% by weight, relative to the total weight of the film.

15. The film as claimed in claim 1, wherein the titanium dioxide particles are coated with at least one of an organic coating and a coating of an inorganic oxide.

16. The film as claimed in claim 1, wherein at least about 95% of the titanium dioxide particles are rutile.

17. A multilayered, white, biaxially-oriented polypropylene film which comprises at least three layers and has a Berger whiteness of more than about 80 and a density of about 0.90 g/cm$^3$ to 0.92 g/cm$^3$.

18. A multilayered, white, biaxially-oriented polypropylene film as claimed in claim 17, having a Berger whiteness of more than about 90.

19. A packaging material comprising a film as claimed in claim 1.

20. A packaging material comprising a film as claimed in claim 17.

21. The film as claimed in claim 1, having a total thickness of about 25 to 120 μm, an intermediate layer thickness of about 0.3 to 5 μm and a top layer thickness of about 0.1 to 5 μm.

22. The film as claimed in claim 21, having a total thickness of about 30 to 60 μm, an intermediate layer thickness of about 0.5 to 3 μm and a top layer thickness of about 0.6 to 2 μm.

* * * * *